US010279267B2

(12) United States Patent
Brew et al.

(10) Patent No.: US 10,279,267 B2
(45) Date of Patent: *May 7, 2019

(54) MONITORING GAME ACTIVITY TO DETECT A SURROGATE COMPUTER PROGRAM

(71) Applicant: International Business Machines Corporation, Armonk, NY (US)

(72) Inventors: Kevin W. Brew, Albany, NY (US); Michael S. Gordon, Yorktown Heights, NY (US); James R. Kozloski, New Fairfield, CT (US); Ashish Kundu, Elmsford, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,852

(22) Filed: Nov. 3, 2017

(65) Prior Publication Data

US 2018/0361251 A1    Dec. 20, 2018

Related U.S. Application Data

(63) Continuation of application No. 15/626,396, filed on Jun. 19, 2017.

(51) Int. Cl.
*A63F 13/75* (2014.01)
*A63F 13/73* (2014.01)

(52) U.S. Cl.
CPC .............. *A63F 13/75* (2014.09); *A63F 13/73* (2014.09)

(58) Field of Classification Search
None
See application file for complete search history.

(56) References Cited

U.S. PATENT DOCUMENTS

| 2002/0082076 | A1* | 6/2002 | Roser ..................... G07F 17/32 463/25 |
| 2004/0078572 | A1* | 4/2004 | Pearson .................. A63F 13/12 713/170 |

(Continued)

FOREIGN PATENT DOCUMENTS

KR    20170039336 A  *  4/2017

OTHER PUBLICATIONS

Platzer, Sequence-Based Bot Detection in Massive Multiplayer Online Games, Dec. 2011, http://ieeexplore.ieee.org/stamp/stamp.jsp?tp=&arnumber=6174239 , pp. 1-5.*

(Continued)

*Primary Examiner* — Tramar Harper
(74) *Attorney, Agent, or Firm* — Cantor Colburn LLP; Kevin Michael Jordan

(57) ABSTRACT

Embodiments of the invention are directed to a computer-implemented method for monitoring game activity of a game system. A non-limiting example of the method includes monitoring, by a processing device, game activity of the game system. The processing device determines characteristics of the game activity, along with expected characteristics of the game activity. The processing device analyzes the characteristics of the game activity and the expected characteristics of the game activity. Based at least in part on analyzing the characteristics of the game activity and the expected characteristics of the game activity, an entity that is controlling the game system is determined.

12 Claims, 7 Drawing Sheets

(56) References Cited

U.S. PATENT DOCUMENTS

| | | | | |
|---|---|---|---|---|
| 2004/0242321 | A1* | 12/2004 | Overton | G06F 21/128 463/29 |
| 2005/0288103 | A1* | 12/2005 | Konuma | A63F 13/12 463/42 |
| 2007/0054716 | A1* | 3/2007 | Hiruta | A63F 13/12 463/1 |
| 2008/0004107 | A1* | 1/2008 | Nguyen | G06Q 10/10 463/29 |
| 2008/0305869 | A1* | 12/2008 | Konforty | A63F 13/12 463/29 |
| 2009/0048010 | A1* | 2/2009 | Kroeckel | G07F 17/32 463/13 |
| 2009/0054123 | A1* | 2/2009 | Mityagin | A63F 13/12 463/9 |
| 2010/0222142 | A1* | 9/2010 | Mori | A63F 13/12 463/29 |
| 2010/0240449 | A1* | 9/2010 | Corem | A63F 13/12 463/29 |
| 2011/0256932 | A1* | 10/2011 | Kim | A63F 13/12 463/42 |
| 2012/0071243 | A1* | 3/2012 | Kojima | A63F 13/80 463/40 |
| 2013/0184070 | A1* | 7/2013 | Gadher | G06F 19/00 463/29 |
| 2013/0227642 | A1* | 8/2013 | Chang | G06F 21/316 726/2 |
| 2013/0288647 | A1* | 10/2013 | Turgeman | H04W 12/06 455/411 |
| 2013/0324235 | A1* | 12/2013 | Kim | A63F 13/12 463/29 |
| 2013/0344940 | A1* | 12/2013 | Kurabayashi | A63F 13/47 463/23 |
| 2014/0287826 | A1* | 9/2014 | Zhao | G06F 21/645 463/29 |
| 2015/0224402 | A1* | 8/2015 | Yang | A63F 13/75 463/29 |

OTHER PUBLICATIONS

List of IBM Patents or Patent Application Treated as Related; Date Filed: Nov. 3, 2017, p. 1-2.

Kevin W. Brew, et al.,"Monitoring Game Activity to Detect a Surrogate Computer Program." U.S. Appl. No. 15/626,396, filed Jun. 19, 2017.

* cited by examiner

MONITORING GAME ACTIVITY TO DETECT A SURROGATE COMPUTER PROGRAM

This application is a continuation of U.S. patent application Ser. No. 15/626,396, entitled "MONITORING GAME ACTIVITY TO DETECT A SURROGATE COMPUTER PROGRAM," filed Jun. 19, 2017, the disclosure of which is incorporated by reference herein in its entirety.

BACKGROUND

The present invention generally relates to electronic games, and more specifically, to monitoring electronic game activity to detect that an electronic game is being controlled or played by a surrogate computer system (e.g., a game bot).

Electronic games (e.g., video games) employ electronics to create an environment with which a game player can interact to play the electronic game. The electronic game can be implemented utilizing various game platforms such as personal computing devices, video game consoles, and the like. An online game is an electronic game that is either partially or primarily played through the internet or another computer network. Online games often involve multiple players who play the electronic games competitively.

SUMMARY

Embodiments of the present invention are directed to a computer-implemented method for monitoring game activity of a game system. A non-limiting example of the method includes monitoring, by a processing device, game activity of the game system. The processing device determines characteristics of the monitored game activity, along with expected characteristics of the monitored game activity. The processing device analyzes the characteristics of the monitored game activity and the expected characteristics of the monitored game activity. Based at least in part on analyzing the characteristics of the monitored game activity and the expected characteristics of the monitored game activity, an entity that is controlling the game system is determined.

Embodiments of the present invention are also directed to a system for detecting surrogate computer program usage in an electronic game. Additional embodiments of the present invention are directed to a computer program product for detecting surrogate computer program usage in an electronic game.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
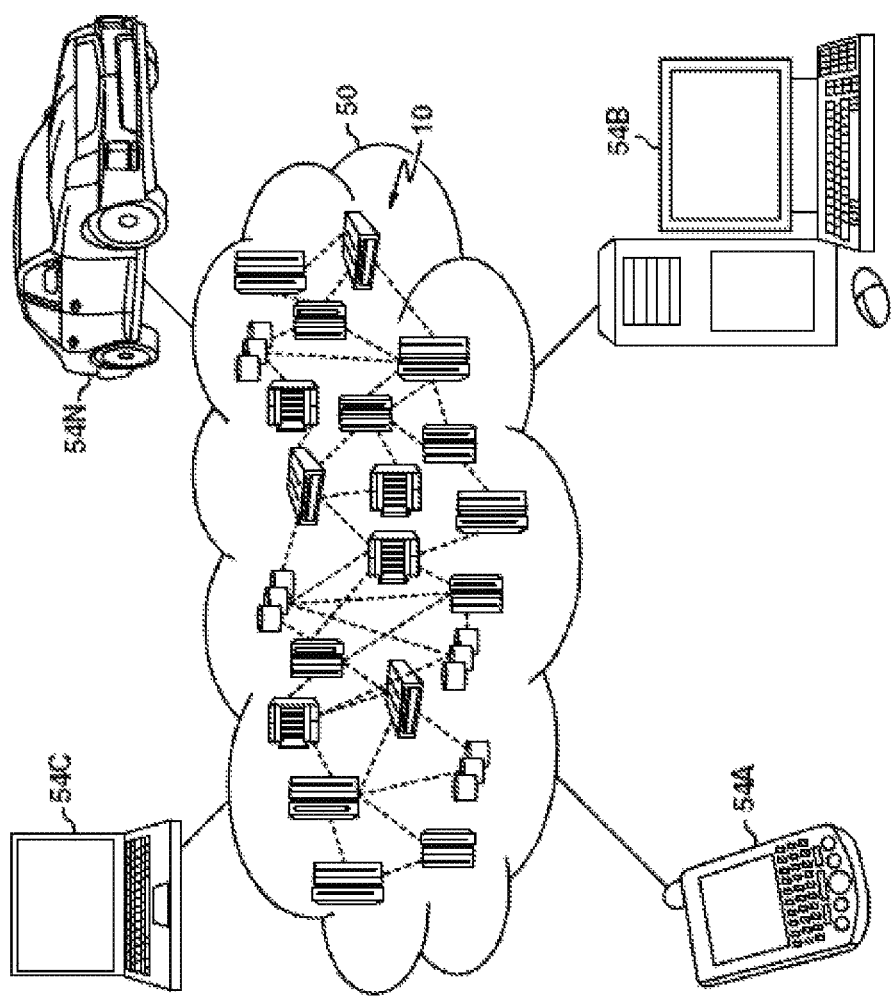
FIG. 1 depicts an example of a cloud computing environment according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
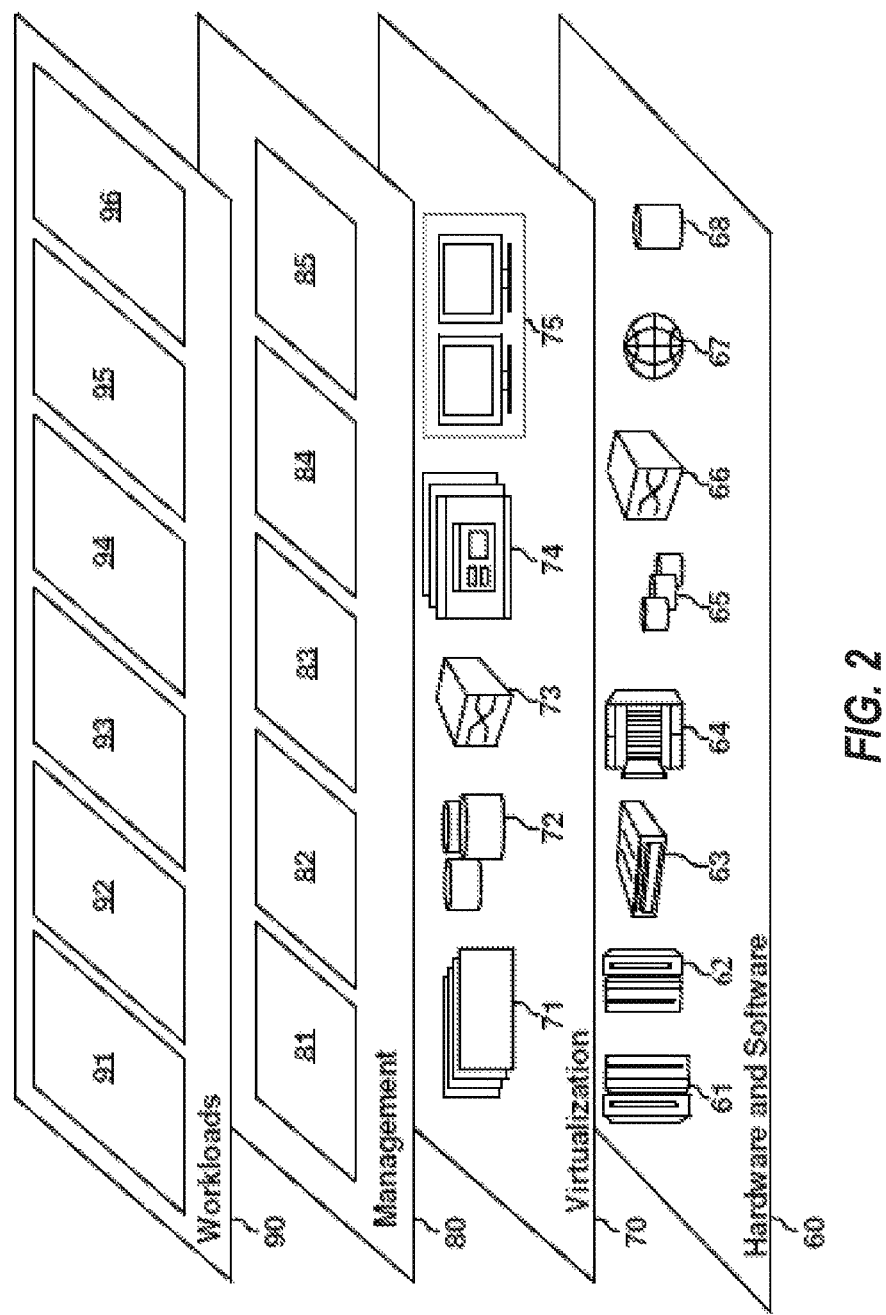
FIG. 2 depicts an example of abstraction model layers of a system according to embodiments of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring and analyzing game activity 96. The phrase "game activity" is used herein to include, potentially, any aspect of how the computer hardware, software and transmission lines of a local and/or networked electronic game system executes operations in the course of executing electronic game software. Game activity can further include the data and/or diagrams (e.g., game maps) derived in the course of the electronic game system executing electronic game software.

Figure 3:
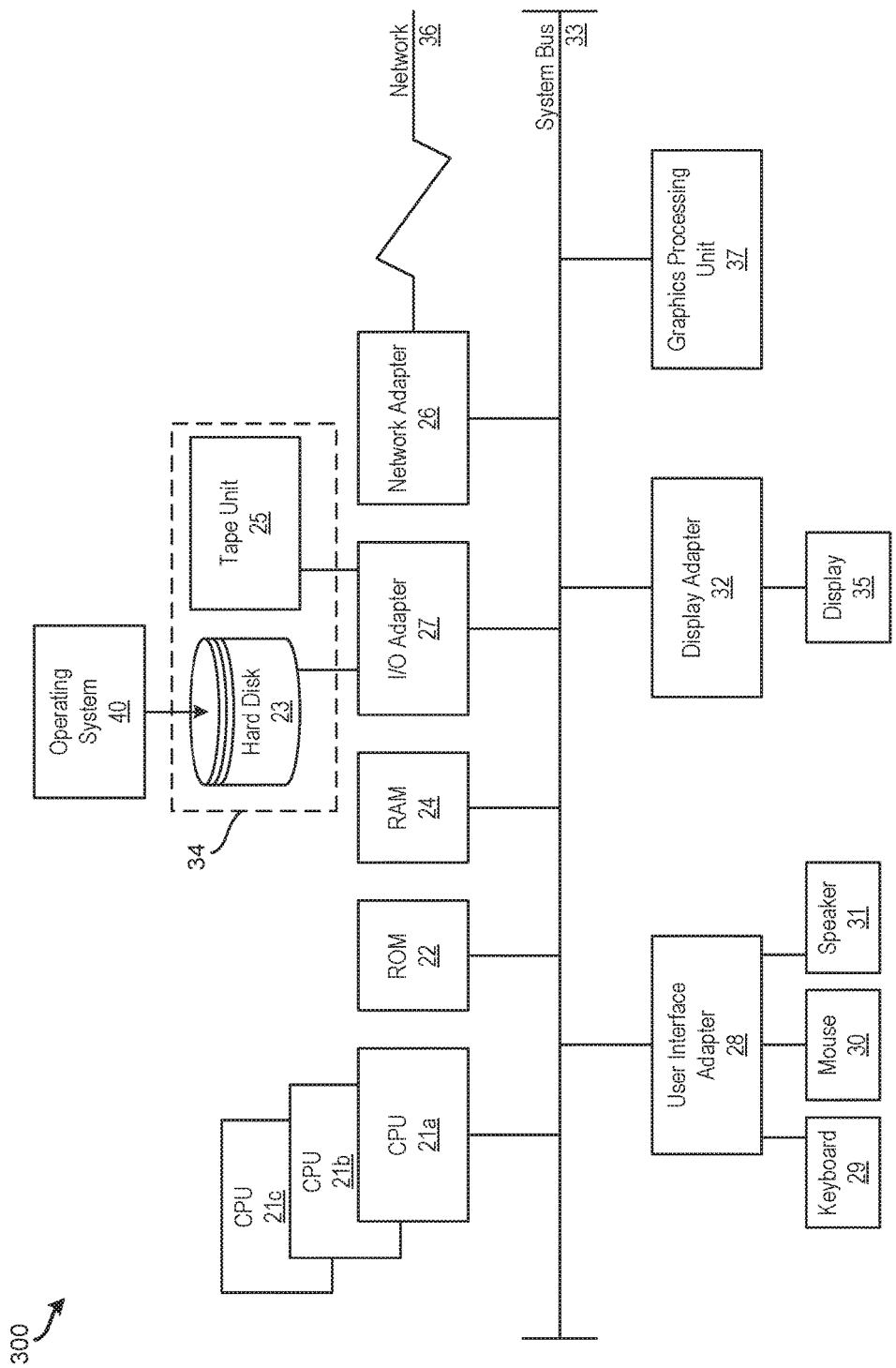
FIG. 3 depicts an example of a processing system according to embodiments of the invention.

Embodiments of the present invention are capable of being implemented in conjunction with any other suitable type of computing environment now known or later developed. For example, FIG. 3 illustrates a block diagram of a processing system 300 for implementing the techniques described herein. In examples, processing system 300 has one or more central processing units (processors) 21a, 21b, 21c, etc. (collectively or generically referred to as processor (s) 21 and/or as processing device(s)). In aspects of the present invention, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 300.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 may be stored in mass storage 34. A network adapter 26 interconnects system bus 33 with an outside network 36 enabling processing system 300 to communicate with other such systems.

A display (e.g., a display monitor) 35 is connected to system bus 33 by display adaptor 32, which may include a graphics adapter to improve the performance of graphics intensive applications and a video controller. According to aspects of the present invention, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. In some aspects of the present invention, a portion of system memory (e.g., RAM 24) and mass storage 34 collectively store an operating system such as the AIX® operating system from IBM Corporation to coordinate the functions of the various components shown in processing system 300.

Turning now to an overview of technologies that are more specifically relevant to aspects of the invention, various game platforms/systems, such as personal computing devices, video game consoles, and the like can be used to play electronic games. A typical game platform/system includes an input device (also referred to as a "game controller") and an output device. The input device sends input commands, which have been entered into the input device by a human game player, to the game platform/ system. The output device provides the human game player with feedback generated from the electronic game. The input device can be one or more of a joystick, a gamepad, a touchscreen, a keyboard, a mouse, etc., and suitable combinations thereof that receive inputs from the human game player (e.g., button press, movement of joystick, etc.) and send commands to the game platform/system to cause the electronic game to implement various commands (e.g., move, jump, shoot, etc.) based on the human game player's input. The output device can be one or more of a display device, speakers, vibration/haptic sensors, a virtual reality headset, etc., and suitable combinations thereof to provide the human game player with feedback generated from the electronic game.

Electronic games can be single player or multiplayer and can be played on a single game platform or using multiple game platforms connected together, such as by the internet or another suitable network. Some games are considered massively multiplayer online (MMO) games that support large numbers of game players in the same environment.

In electronic games, a bot (i.e., bot software or bot system) is a type of artificial intelligence (AI) computer program that can be used in a variety of electronic game genres for a variety of tasks. For example, a bot can be used to automate a repetitive and tedious task like farming. A bot can also be used in an electronic game to analyze a "map," which is the total space available to the player during the course of completing a discrete objective. Surrogate bots are written to analyze game maps to mimic how a human would play the game. Surrogate bots can play against other surrogate bots and/or human players in unison over the internet, on a local area network (LAN) or in a local session. Advanced surrogate bots can include machine learning for dynamic learning of patterns of the opponent as well as dynamic learning of previously unknown maps. Less advanced surrogate bots can rely completely on lists of waypoints created for each map by the developer, limiting the surrogate bot to play only maps with the known waypoints.

Using a bot as a surrogate for a human game participant is generally against the rules of current massively multiplayer online role-playing games (MMORPGs). A human game participant who surreptitiously uses a surrogate bot to play an electronic game in place of the game participant gains an unfair advantage over other players, particularly gaming competitions. Players who use surrogate bot systems give an inaccurate sense of the human game player's game-playing skills to others.

Turning now to an overview of aspects of the invention, one or more embodiments of the invention detect the use of a surrogate bot computer program (or a bot system) in an electronic game system. In some embodiments of the invention, a detection system is used to monitors the game activity of an electronic game system. The phrase "game activity" is used herein to include, potentially, any aspect of how the computer hardware, software and transmission lines of a local and/or networked electronic game system executes operations in the course of executing electronic game software. Game activity can further include the data and/or diagrams (e.g., game maps) derived in the course of the electronic game system executing electronic game software. The detection system identifies selected game activity and characteristics of the selected game activity to identify patterns. The game activity is analyzed to identify patterns that are representative of game activity that would occur if the electronic game system were being controlled or "played" by a surrogate bot computer program instead of by a human game player.

In some embodiments of the invention, the game activity includes the input commands (e.g., number of button presses, movement of joystick, etc., and their timing) entered into the electronic game platform/system input device. The game activity detection system according to some embodiment of the invention analyzes the input commands. In some embodiments of the invention, the analysis can include comparing the actual input command characteristics to the limits (upper and/or lower) of the input command characteristics that would be expected if the inputs were generated by a human. The determination of the game input characteristics that are beyond a human level can be based on human physiological, neuro-motor, and neuro-musculature data for example. In some embodiments of the invention, the analysis can include comparing the actual input command characteristics to the input command characteristics that would be expected if the input commands were generated by a surrogate bot computer program. For example, embodiments of the invention leverage the observation that surrogate bot computer programs would generate actual input commands faster and more efficiently than a human could generate actual input commands, given the physical characteristic and limits of human abilities. The human abilities can be age related. For example, a child human user might have slower reflexes than a college-aged human user.

Based at least in part on the above-described analysis, the game activity detection system determines that the actual input command characteristics are sufficiently within the limits of the input command characteristics (e.g., speed, efficiency, etc.) that would be expected if the actual input commands were generated by a human. In some embodiments, based at least in part on the above-described analysis, the game activity detection system determines that the actual input command characteristics are sufficiently within the range of actual input command characteristics that would be expected if the actual input commands were generated by a surrogate bot computer program.

The above-described game-input-based embodiments are examples, and embodiments of the invention can be based on an analysis of other selected game activity as long as distinctions can be drawn between characteristics of the game activity that are indicative of a human controlling or playing the electronic game platform/system and characteristics of the game activity that are indicative of a surrogate bot computer program controlling or playing the electronic game platform/system.

In some embodiments of the invention, the bot detection system, based at least in part on detecting the use of a surrogate bot computer program, can initiate a corrective action to mitigate or reduce the effectiveness of the surrogate bot computer program. For example, a corrective action can be initiated if the expected game play limits are exceeded. The corrective action can reduce the effectiveness of the surrogate bot computer system so as to neutralize the effect of the surrogate bot computer program.

Figure 4:
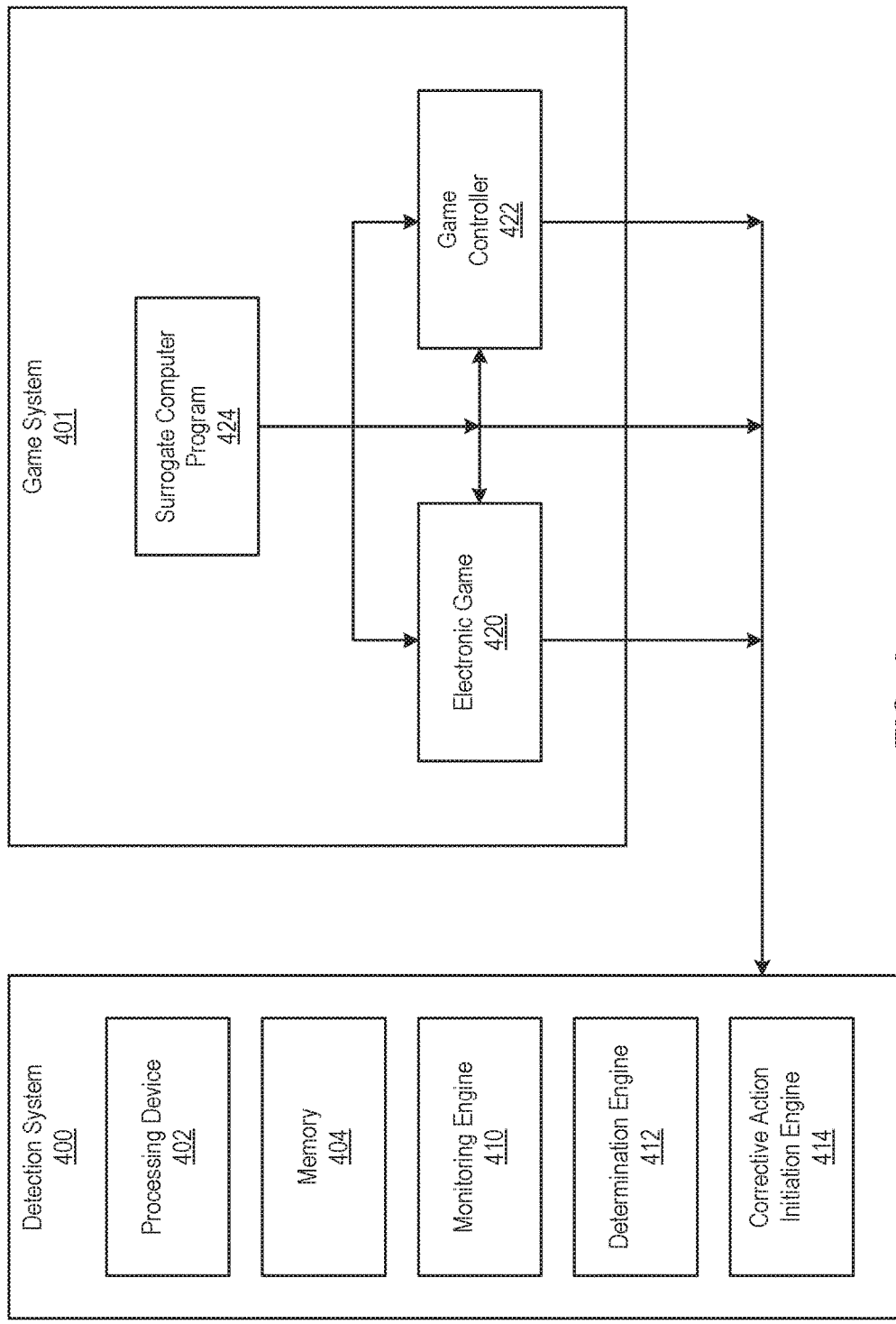
FIG. 4 depicts an example of a system according to embodiments of the invention.

FIG. 4 depicts a game system 401 that includes an electronic game 420, a game controller 422, and an optional surrogate computer program (or bot) 424, configured and arranged as shown. Reference herein to the electronic game 420 includes an electronic game console/processor and/or the electronic game software that is executed by the electronic game console/processor. In some embodiments of the invention, and as described in connection with the processing system 300 shown in FIG. 3, the game system 401 can be implemented as a distributed game system having networked connections between the various modules/components that make up the game system 401. Additionally, although a single electronic game 420 and game controller 422 set is shown, multiple electronic games and/or controllers can be provided to accommodate multiple players.

According to embodiments of the invention, a detection system 400 is provided for detecting that characteristics of selected game activity of the game system 401 are outside the expected "human" limits. The detection system 400 includes a processing device 402, a memory 404, a monitoring engine 410, a determination engine 412, and a corrective action initiation engine 414, configured and arranged as shown.

The detection system 400 monitors actual game activity of the game system 401 to determine that the actual game activity characteristics exceed expected game activity characteristics limits. In some embodiments of the invention, the expected game activity characteristics limits are game activity characteristics that are beyond or outside what is expected to be achieved by a human operating or playing an electronic game on the game system 401. The determination of the game activity characteristics that are beyond or outside an expected human level can be based on human physiological, neuro-motor, and neuro-musculature data for example. Although the embodiments of the invention depicted in FIG. 4 are described in connection with situations in which the game activity is game inputs, embodiments of the invention can be based on an analysis of other selected game activity as long as distinctions can be drawn between characteristics of the game activity that are indicative of a human controlling or playing the electronic game platform/system and characteristics of the game activity that are indicative of a surrogate bot computer program controlling or playing the electronic game platform/system.

Continuing with FIG. 4, the electronic game 420 can be controlled by a player (not shown) using the game controller 422. The electronic game 420 and/or the game controller 422 can be controlled by the surrogate bot computer program 424. Although the surrogate bot computer program 424 is depicted as a separate module, the surrogate bot computer program 424 could in some instances be incorporated within the electronic game 420 and/or the game controller 422. As previously noted herein, the communicative connections among and within the detection system 400 and the game system 401 can be any suitable wired or wireless connection and can be direct and/or indirect (e.g., via a network such as the internet or another suitable network).

In some embodiments, one or more of the various components, modules, engines, etc. depicted in FIG. 4 can be implemented as: processor executable instructions (a.k.a. software) stored in memory 404 (and/or on a computer-readable storage medium (not depicted); as hardware modules; as special-purpose hardware (e.g., application specific hardware, e.g., application specific integrated circuits (ASICs); as embedded controllers; hardwired circuitry, etc.), or as some combination of these. By way of further example, some embodiments of components, modules, and/or engine (s) can be a combination of hardware and (software) programming. The programming can be processor executable instructions stored on the tangible memory 404, and the hardware can include a processing device such as the processing device 402 for executing those instructions. Thus, the memory 404 can store program instructions that when executed by the processing device 402 implement one or more of the components, modules, and/or engines described herein. In some embodiments, other components, modules, and/or engines (not depicted) can be utilized to perform one or more features and functionality in accordance with the present invention. Alternatively or additionally, the detection system 400 can include dedicated hardware, such as one or more integrated circuits, application specific integrated circuits (ASICs), application specific special processors (ASSPs), field programmable gate arrays (FPGAs), or any combination of the foregoing, for performing one or more features and functionality in accordance with the present invention.

The monitoring engine 410 monitors game activity of the game system 401. As previously noted herein, the phrase "game activity" includes, potentially, any aspect of how the computer hardware, software and transmission lines of a local and/or networked electronic game system (e.g., game system 401) executes operations in the course of executing electronic game software. Game activity can further include the data and/or diagrams (e.g., game maps) derived in the course of the electronic game system executing electronic game software. As described in greater detail below, the detection system 400 identifies selected game activity and characteristics of the selected game activity to identify patterns. The detection system 400 analyzes the patterns and/or characteristics to identify patterns and/or characteristics that are representative of game activity that would occur if the game system 401 were being controlled or "played" by the surrogate bot computer program 424 instead of a human game player (not shown). For example, in some embodiments of the invention, the game activity can be game inputs from a game player on the game controller 422. Game inputs such as a button press, movement of joystick, etc. are input to the game controller 422 by a player and are sent as signals to the electronic game 420 to cause the electronic game 420 to implement various commands (e.g., move, jump, shoot, etc.) based on the game player's input to the game controller 422.

The game inputs can be generated by the surrogate computer program module 424 and used to manipulate the electronic game 420. For example, and as previously noted herein, the surrogate computer program module 424 can be an external device that connects to the game system 401, is integrated into the game system 401, is integrated into the electronic game 420, is integrated into (or used in place of) the game controller 422, etc. The surrogate computer program module 424 can manipulate the electronic game 420 in a way that replaces human inputs (e.g., sending game commands faster than a human could, etc.). Using the surrogate computer program module 424 in place of a human game participant is generally against the rules of current MMORPGs. A human game participant who surreptitiously uses the surrogate computer program module 424 to control/play the electronic game 420 in place of the game participant gains an unfair advantage over other players, particularly gaming competitions.

Continuing with a description of the components of the detection system 400, the determination engine 412 analyzes characteristics of the game inputs to determine that characteristics of the game inputs are outside the expected human limitations of the game input characteristics. For example, the determination engine 412 can, in some embodiments, compare characteristics of the game inputs to known (or derived) limits for human game players to determine that the game activity is outside the limits the game input characteristics that are expected for a human player. According to embodiments of the invention, a comparison between current and past activities and actions from players can be made. For example, past activities and actions can be stored along with response times for a variety of players. These can be compared to current game inputs to detect surrogate computer program usage. The game input characteristics limits expected of a human player can be based on, for example, human physiological, neuro-motor, and/or neuro-musculature data. According to embodiments of the present invention, the limits expected of a human player are modeled as a multidimensional hull of normal human play based on cognitive motor models applied to game play contexts (see FIG. 7). For example, if the determination engine 412 determines that game input characteristics are indicative of game inputs that are presented to the electronic game 420 faster than an expected user response time taking into account the particular game controller, the determination engine 412 determines that it is likely that the surrogate computer program 424 is controlling the electronic game 420.

According to some embodiments of the present invention, the determination engine 412 makes the above-described determination based at least in part on determining a confidence level that the characteristics of the game inputs are outside the expected human limits of the characteristics of the game inputs. According to embodiments of the present invention, the determination engine 412 can determine the expected human game input characteristics by applying deep neural nets to game player behavior for a plurality of game players. For example, the game player behavior can include a game level attained by each of the plurality game players, a skill level of each of the plurality game players, a time since joining a game for each of the plurality game players, a user history for each of the plurality game players, a typical duration of use per day for each of the plurality game players, historical gameplay data for each of the plurality game players, and the like. In one or more embodiments of the present invention, the determination engine 412 can determine the expected human game input characteristics by applying deep neural nets to game activity and/or game play limits.

According to embodiments of the present invention, the determination engine 412 can utilize machine learning functionality to accomplish the various operations of the determination engine 412 described herein. More specifically, the engine 412 can incorporate and utilize rule-based decision making and AI reasoning to accomplish the various operations of the decision engine 412 described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used by the determination engine 412 to determine surrogate computer program usage. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Continuing with a description of the components of the detection system 400, the corrective action initiation engine 414 initiates a corrective action based at least in part on comparing the game activity to the expected game play limits, such as for a given user. For example, a corrective action can be initiated if the expected game play limits are exceeded. The corrective action can include one or more of sending an alert, removing the game player from the electronic game, nullifying any gain resulting from the game inputs indicative of surrogate computer program usage, changing a color of an avatar of the user, removing points from the user, removing a game item from the user, stopping the game, and posting a message to social media indicating that the game inputs are indicative of surrogate computer program usage. According to embodiments of the present invention, the corrective action initiation engine 414, similar to the determination engine 412, can utilize machine learning functionality to accomplish the various operations of the corrective action initiation engine 414 described herein. More specifically, the engine 414 can incorporate and utilize rule-based decision making and AI reasoning to accomplish the various operations of the corrective action initiation engine 414 described herein.

According to embodiments of the invention, the corrective action can be selected based at least in part on the severity of the surrogate computer program usage as indicated by the confidence level. A less severe corrective action can correspond to a lower confidence level while a more severe corrective action can correspond to a higher confidence level. For example, a lower confidence level can be associated with a warning sent to the player, a medium confidence level can be associated with removing points from the player, and a higher confidence level can be associated with banning the player from the game, such as for a period of time or permanently. This can be useful if a player is using a surrogate computer program for the first time so that the player can be warned before being banned. Or, in a situation in which the player continues to cheat, the corrective action can be more severe.

The cloud computing system 50 (shown in FIG. 1) is in wired or wireless electronic communication with one or all of the modules that make up the detection system 400 and the game system 401. Cloud computing system 50 can supplement, support or replace some or all of the functionality of the various modules that make up the detection system 400 and the game system 401. Using the cloud computing system 50 can be particularly useful in MIO games to discourage or prevent surrogate computer program usage and to facilitate fair competition among the many game players.

Figure 5:
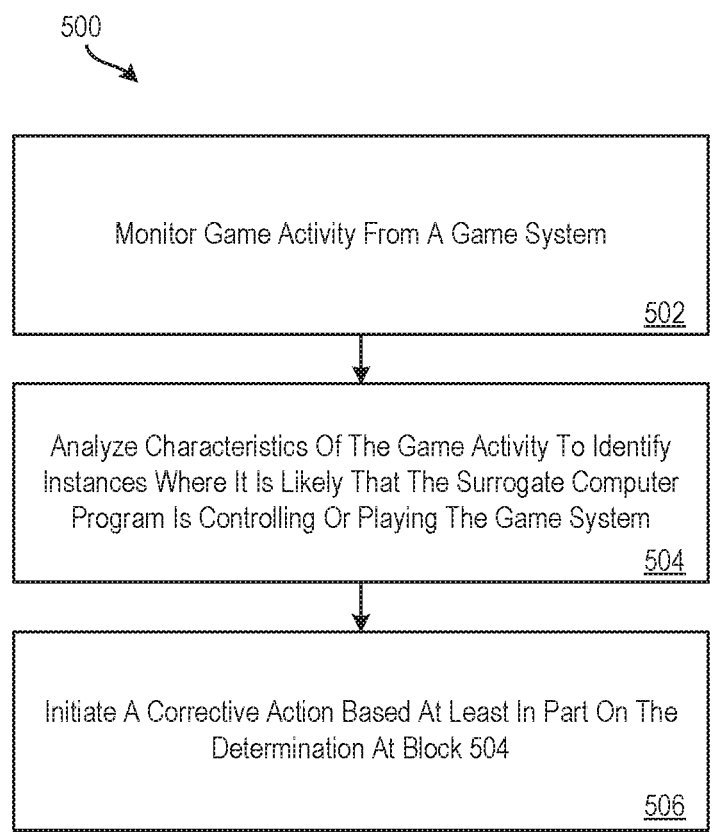
FIG. 5 depicts an example of a method according to embodiments of the invention.

FIG. 5 depicts a method 500 for monitoring game activity in an electronic game according to embodiments of the present invention. The method 500 can be implemented using the processing system 300 of FIG. 3, the detection system 400 of FIG. 4, or another suitable processing system. The method 500 can also be deployed in a cloud computing environment such as on the cloud computing environment 50 of FIG. 1.

At block 502, the monitoring engine 410 of the detection system 400 monitors game activity from the game system 401. The monitoring engine 410 can monitor game activity from the electronic game 420, from the game controller 422, or from other portions of the game system 401. For example, in embodiments of the invention where the game activity includes game inputs, the game inputs that are input into the electronic game 420 can be monitored by the determination engine 412.

Figure 7:
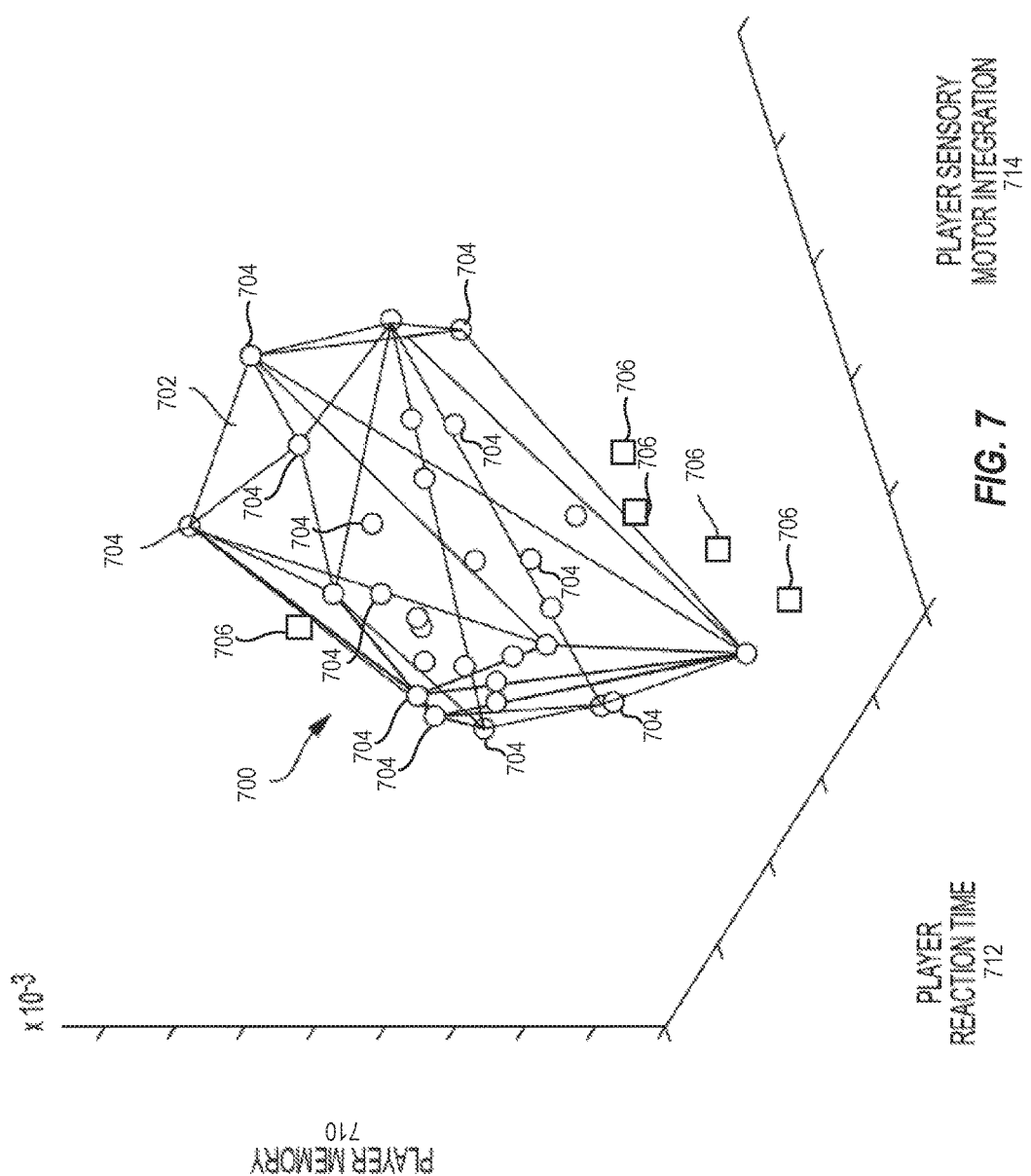
FIG. 7 depicts an example of a multidimensional hull according to embodiments of the invention.

At block 504, the determination engine 412 of the detection system 400 analyzes characteristics of the game activity to identify instances where it is likely that the surrogate computer program 424 is controlling and/or "playing" the game system 401. In some embodiments of the invention, the analysis of the characteristics of the game activity includes comparing the characteristics of the game activity to the expected characteristics of the game activity when the game system 401 is being controlled and/or "played" by a human game player or the surrogate computer program 424. For example, the characteristics of game activity are indicative of surrogate computer program (or bot) usage when the characteristics of the game activity are beyond or outside game activity characteristic limits that would be expected when a human game player is controlling or playing the game system 401. In some embodiments of the invention, the analysis of the characteristics of the game activity incorporates and utilizes rule-based decision making and AI reasoning to identify instances where it is likely that the surrogate computer program 424 is controlling the game system 401. The limits of human level game activity characteristics can be developed based at least in part on, for example, human physiological, neuro-motor, and neuro-musculature data, and can be modeled as a multidimensional hull 700 of normal human play as depicted in FIG. 7.

At block 506, the corrective action initiation engine 414 of the detection system 400 initiates a corrective action based at least in part on the determinations made at block 504. For example, in some embodiments of the invention, the engine 414 initiates corrective action when the determination engine 412 determines that characteristics of the actual game activity are outside the limits of game activity characteristics that are expected if the game system 401 is controlled by a human game player. The corrective action can be sending an alert, removing the game player from the electronic game, nullifying any gain resulting from using the surrogate computer program 424, changing a color of an avatar of the user, removing points from the user, removing a game item from the user, stopping the game, and posting a message to social media indicating that the characteristics of game activity are indicative of surreptitiously and/or improperly using the surrogate computer program 424 to control the game system 401. Moreover, the corrective action can be selected based at least in part on the severity of the use of the surrogate computer program 424 to control the game system 401 (e.g., more severe surrogate usage results in more severe corrective actions).

Figure 6:
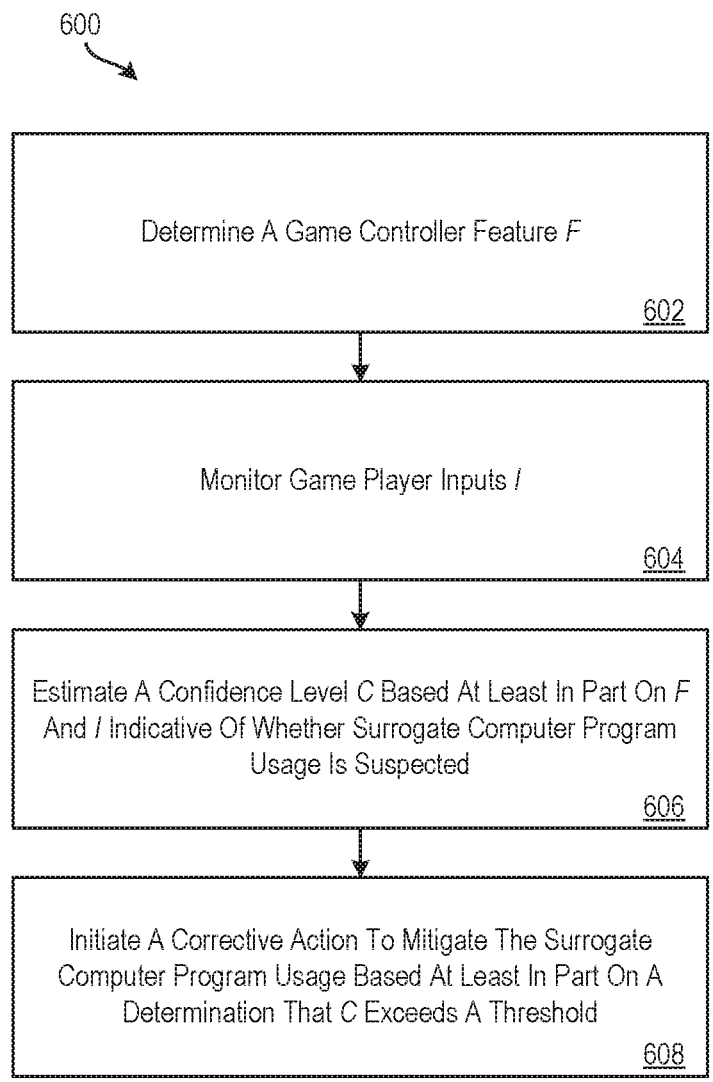
FIG. 6 depicts an example of a method according to embodiments of the invention.

FIG. 6 depicts a method 600 for detecting that the surrogate computer program 424 is being used to control and/or play the electronic game 220 on the game system 401 according to embodiments of the present invention. The method 600 can be implemented using the processing system 300 of FIG. 3, the detection system 400 of FIG. 4, or another suitable processing system. The method 600 can also be deployed in a cloud computing environment such as on the cloud computing environment 50 of FIG. 1. In the method 600, the game activity includes game inputs.

At block 602, the monitoring engine 410 of the detection system 400 determines a game controller feature F. Player inputs are often performed on a game controller (e.g., the game controller 422 of FIG. 4) such as keyboards, mice, gamepads, joysticks, etc. Special purpose devices, such as steering wheels for driving games and light guns for shooting games, are also types of game controllers. Game controllers can include directional pads, multiple buttons, analog sticks, joysticks, motion detection, touch screens, tilt sensors, accelerometers, etc. Game controllers can include different features that facilitate game interaction such as: being wireless, rumble features (i.e. haptic feedback), motion sensing, number of action buttons, ergonomics, etc. The monitoring engine 410 determines a game controller feature F based on the game controller that is used to play the game. Additionally, the feature of the game controller can include attributes, such as form factor (e.g., joystick, button, etc.) and other properties, such as range of motion, numbers of degrees of freedom, that are stored in a database (not shown).

At block 604, the monitoring engine 410 of the detection system 400 monitors game player inputs I. For example, a game player uses the game controller 422 to provide inputs I to the electronic game 420. As the game player uses the game controller 422, the game controller 422 sends signals to the electronic game 420 to manipulate the game (e.g., move a character in the game, etc.).

At block 606, the determination engine 412 of the detection system 400 analyzes the game inputs by estimating a confidence level C based at least in part on the game controller feature F and the game player inputs I. The confidence level C is indicative of whether surrogate computer program usage is suspected. For example, the confidence level C can indicate that the game player is using software tools to receive an unfair advantage. The game player can be known, and prior inputs from the game player can be compared to current game player inputs I to determine surrogate computer program usage.

The confidence level C can be calculated using a cognitive modeling component that takes as input the game controller, contextual information about the game, and human motor and cognitive models to set thresholds for game play. These thresholds are depicted in FIG. 7 as a multidimensional hull 700. In particular, FIG. 7 depicts a multidimensional hull 700 of normal human play based on cognitive motor models according to embodiments of the present invention.

Referring now to FIG. 7, the thresholds for game play exist as a closed-hull boundary in a multidimensional space representing human limits for each dimension of the model in the context of game play. The game play of a human typically falls within the limits of the hull 700 in order for the determination engine 412 to deem that a human game player has not been replaced by a surrogate computer program (e.g., surrogate computer program 424 shown in FIG. 4). For example, the dots 704 represent instances of game player inputs that are within the limits (i.e., within the hull 700) of normal human game play. However, the squares 706 represent instance of game player inputs that are outside the limits (i.e., outside the hull 700) of normal human game play. For example, the square 706 indicates a player input that is beyond traditional reaction times and player sensory motor integration, which is indicative of surrogate computer program usage.

The hull 700 is generated from various cognitive reaction times, motor reaction times, and game play contexts. Cognitive reaction times can include memory, sensory integration, context switching, perception, recognition, discrimination, insight, multi-tasking, prediction, emotional control, and the like. Motor reaction time can include reaction time, muscle fatigue, repetition rates, etc. Game play contexts can include game type, difficulty level, and the like. These aspects are used to model normal human game play. The hull 700 can be generated generally for a population of players using data from the population, or the hull 700 can be generated for an individual player using data from that individual player.

Provided that the human player's game play remains within the multidimensional hull 700, the player is deemed to not be using the surrogate computer program 424 to control or play the game system 401. However, any movement outside of the hull 700 represents the likelihood that the human game player has been replaced by the surrogate computer program 424 to control or play the game system 401. In this way, non-linear combinations of the various dimensions (e.g., memory, reaction time, and sensory motor integration) can be accounted for to represent normal human play. These combinations then represent a limit of human attention, multi-tasking ability, memory, etc., which, when mapped into the hull 700, can be assessed at each state of human play in the game to determine surrogate computer program usage.

Returning to the method 600 shown in FIG. 6, at block 608, the corrective action initiation engine 414 of the detection system 400 initiates a corrective action to mitigate the surrogate computer program usage based at least in part on a determination that the confidence level C exceeds a threshold. As described above, the correction action can be sending an alert, removing the game player from the electronic game, nullifying any gain resulting from the game inputs indicative of surrogate computer program usage, changing a color of an avatar of the user, removing points from the user, removing a game item from the user, stopping the game, and posting a message to social media indicating that the game inputs are indicative of surrogate computer program usage. Moreover, the corrective action can be selected based on severity of the surrogate computer program usage (e.g., more severe surrogate computer program usage results in more severe corrective actions).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for monitoring game activity of a game system, the method comprising:
    monitoring, by a processing device, game activity of the game system;
    determining, by the processing device, characteristics of the game activity;
    determining, by the processing device, expected characteristics of the game activity based at least in part on a cognitive reaction time of a human and a motor reaction time of the human, wherein determining the expected characteristics of the game activity comprises generating, based at least in part on the cognitive reaction time and the motor reaction time, a three-dimensional closed-hull boundary representing human limits;
    analyzing, by the processing device, the characteristics of the game activity and the expected characteristics of the game activity;
    determining, based at least in part on analyzing the characteristics of the game activity and the expected characteristics of the game activity, whether a human is controlling the game system, wherein it is determined that the human is controlling the game system when game activity is within the three-dimensional closed-hull boundary; and
    determining, based at least in part on analyzing the characteristics of the game activity and the expected characteristics of the game activity, whether a surrogate computer program is controlling the game system, wherein it is determined that the surrogate computer program is controlling the game system when game activity is not within the three-dimensional closed-hull boundary.

2. The computer-implemented method of claim 1 further comprising initiating, by the processing device, a corrective action based at least in part on determining the entity that is controlling the game system.

3. The computer-implemented method of claim 2, wherein the corrective action is selected from the group consisting of: sending an alert, removing a game player from an electronic game, nullifying any gain resulting from surrogate computer program usage, changing a color of an avatar of a user, removing points from a game player, removing a game item from the game player, stopping a game, posting a message to social media indicating that a game player is using a surrogate computer program, and slowing down a game player as if a character of the game player is moving through a viscous substance.

4. The computer-implemented method of claim 2, wherein:
    analyzing the characteristics of the game activity and the expected game activity comprises comparing the characteristics of the game activity to the expected characteristics of the game activity; and
    the expected characteristics of the game activity comprise game play limits that are based at least in part on an expected human level of game play.

5. The computer-implemented method of claim 4, wherein the expected human level of game play is based on human physiological, neuro-motor, or neuro-musculature data, and wherein the expected human level of game play is based at least in part on a type of game controller used to generate the game activity.

6. The computer-implemented method of claim 4, wherein comparing the characteristics of the game activity to expected characteristics of the game activity comprises determining a confidence level that the game activity exceeds the game play limits.

7. The computer-implemented method of claim 6, wherein:
    the corrective action is selected from a plurality of corrective actions ranging in severity based at least in part on the confidence level;
    a less severe corrective action corresponds to a lower confidence level; and
    a more sever corrective action corresponds to a higher confidence level.

8. The computer-implemented method of claim 6, wherein determining the confidence level comprises applying deep neural nets to one or more of game player behavior for a plurality of game players, the game activity, or the game play limits.

9. The computer-implemented method of claim 8, wherein the game player behavior comprises a game level attained by each of the plurality game players, a skill level of each of the plurality game players, a time since joining a game for each of the plurality game players, a user history for each of the plurality game players, a typical duration of use per day for each of the plurality game players, and historical game activity for each of the plurality game players.

10. The computer-implemented method of claim 1, wherein the game activity is generated from a game controller selected from the group comprising a joystick, a gamepad, a touchscreen, a keyboard, and a mouse.

11. The computer-implemented method of claim 4, wherein comparing the characteristics of the game activity to the expected characteristics of the game activity further comprises comparing the characteristics of the game activity to the three-dimensional closed-hull boundary of normal human play.

12. The computer-implemented method of claim 11, wherein the three-dimensional closed-hull boundary comprises a player memory component, a player reaction time component, and a player sensory motor integration component.

* * * * *